Dec. 1, 1942.   G. M. HOLLEY, JR   2,303,998
POWER AND MIXTURE CONTROL
Filed May 28, 1942   4 Sheets-Sheet 1

George M. Holley Jr.
INVENTOR.

Dec. 1, 1942.　　　G. M. HOLLEY, JR　　　2,303,998
POWER AND MIXTURE CONTROL
Filed May 28, 1942　　　4 Sheets-Sheet 2

George M. Holley Jr.
INVENTOR.
BY

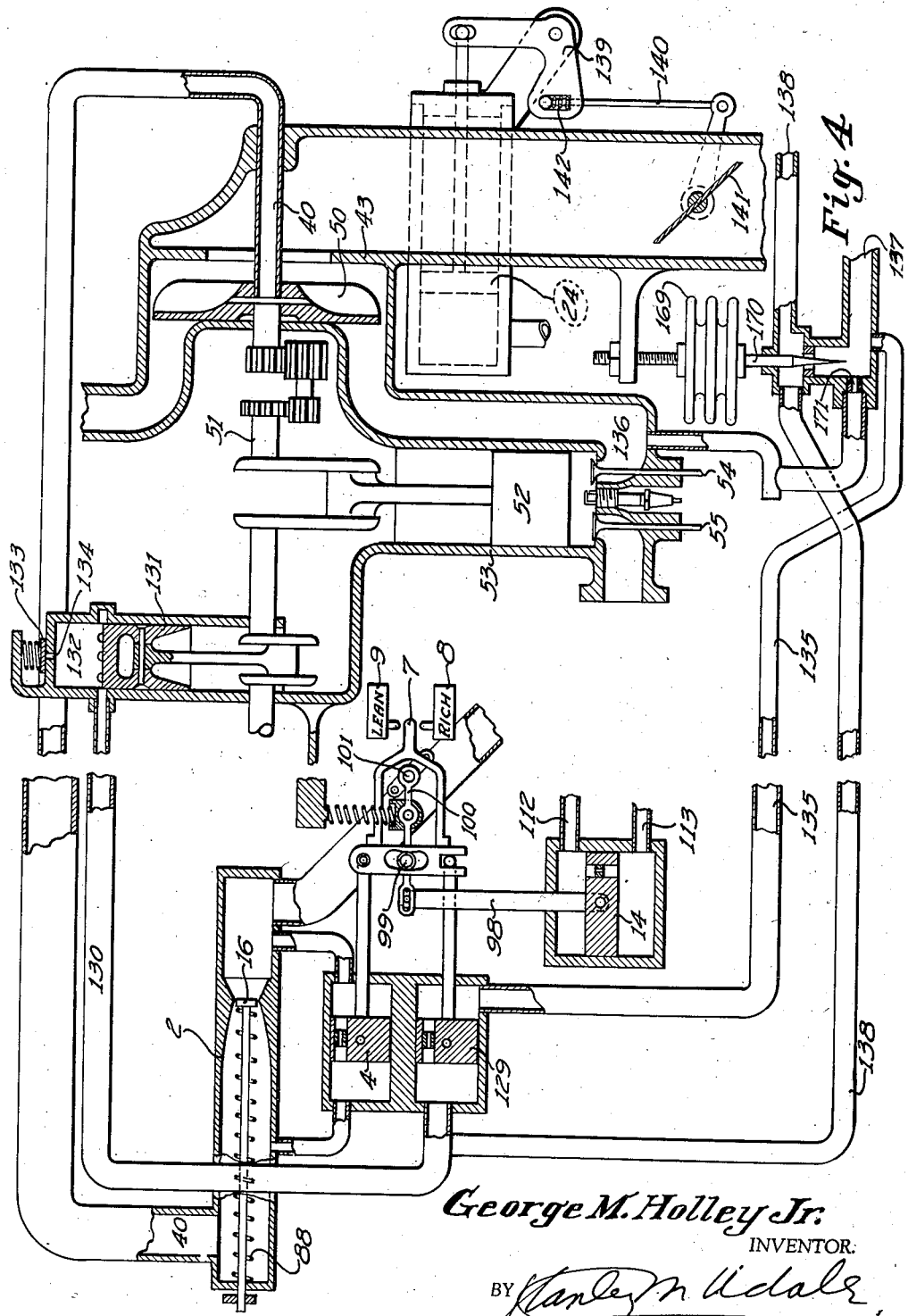

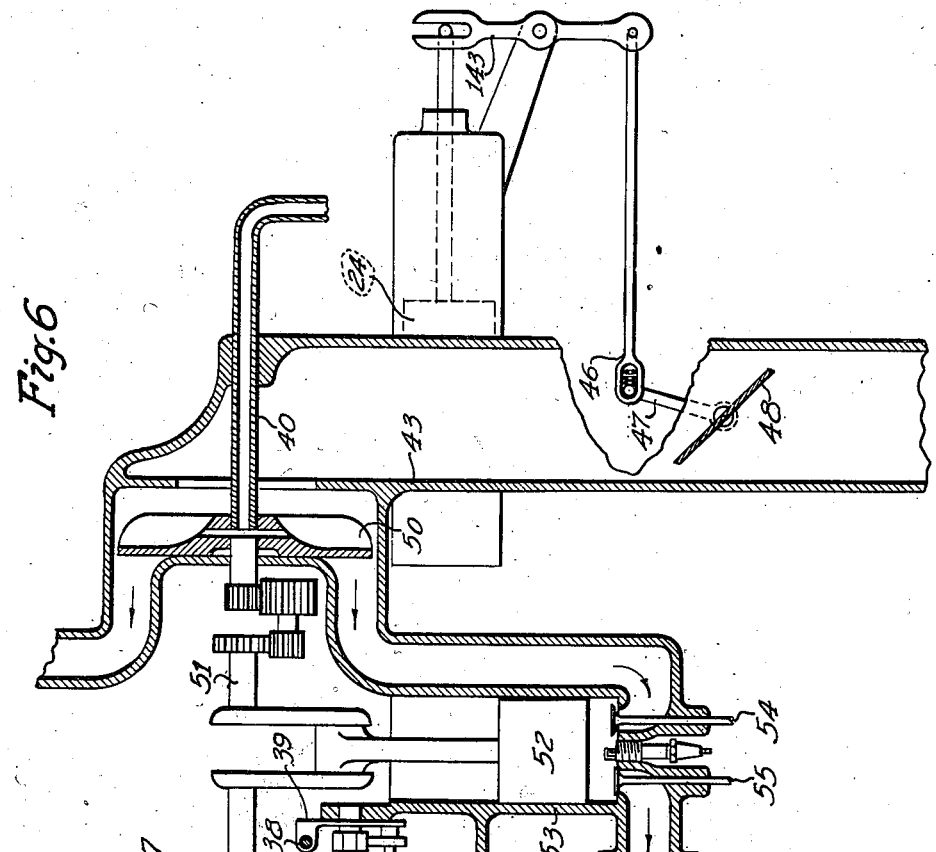
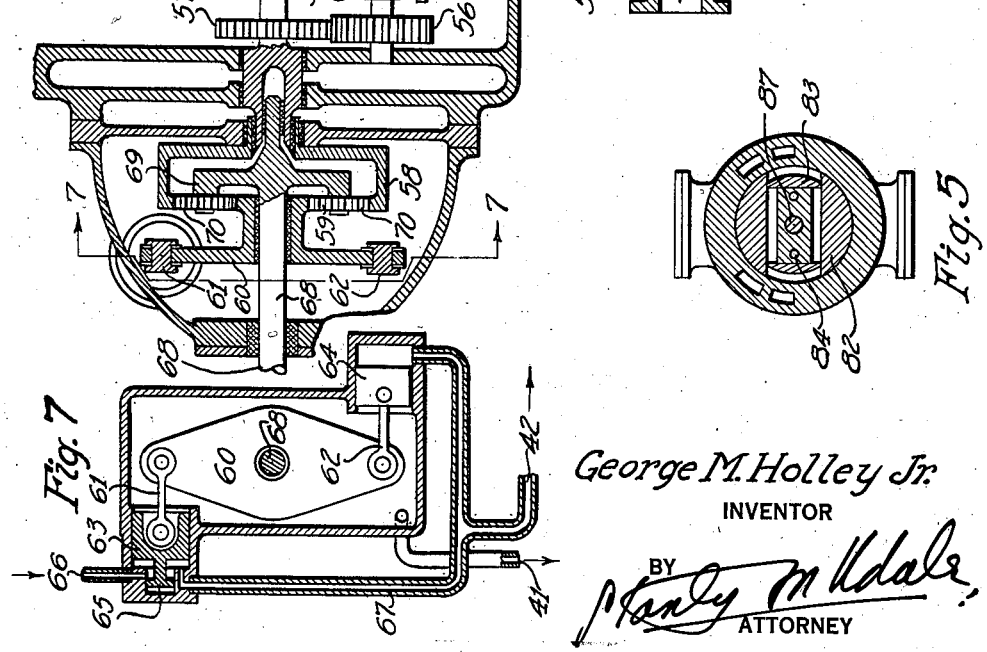
Fig. 6  Fig. 5  Fig. 7
George M. Holley Jr.
INVENTOR

Patented Dec. 1, 1942

2,303,998

UNITED STATES PATENT OFFICE 2,303,998

POWER AND MIXTURE CONTROL

George Malvin Holley, Jr., Grosse Pointe Woods, Mich., assignor to George M. Holley and Earl Holley Application May 28, 1942, Serial No. 444,875

11 Claims. (Cl. 170—135.6)

The object of this invention is to control the fuel flow in an internal combustion engine by means of torque and speed. I have discovered that there is in internal combustion engines under any given R. P. M., a definite relation between torque and fuel in pounds per hour. This relation can be expressed by the formula—fuel is equal to a constant plus a second constant times torque, or, as it is usually written, fuel=A+B×torque, where A is the first constant and B the second constant.

With an engine having a two-stage blower, there are four conditions to be considered: (1) cruising lean low blower; (2) cruising lean high blower; (3) rich mixture low blower; and (4) rich mixture high blower.

In the event that an exhaust driven supercharger is used, there may be an infinite number of stages intermediate high and low blower, so that the term "high" and "low" blower no longer applies, but the principle of operation will be unchanged.

Assume that the engine is equipped with an ordinary torque meter, such as those shown in S. A. E. Journal for June, 1939, pages 271–6, and especially Figure 4 on page 453. Then, at any given revolutions per minute, there should be a definite flow of fuel per revolution of the engine to correspond to any given torque. Therefore, if I have a variable restriction in the line through which the fluel flows to the engine, and if this variable restriction is adjusted for a specific revolution per minute, then the flow through that restriction can be arranged to produce a pressure difference which will be a linear function of the fuel flow and hence, will balance the pressure created by the torque meter when the desired mixture ratio is being supplied. If the fuel flow is greater than that corresponding to this torque and speed combination, then an electric motor can be arranged to reduce the discharge from a variable stroke fuel pump, and if the fuel flow is too small, to adjust the control in the reverse direction.

Hence, it is desirable that the fuel flow be controlled by the torque and the revolutions per minute.

In order to get a control to be responsive to revolutions per minute, I provide a circulating pump which passes a fluid in a closed circuit past a variable restriction. The pressure difference in this circuit between the two sides of the restriction will respond to the speed of the engine, and this also can be arranged to be a linear function of the speed and to control the relative influence of the fuel flow on the torque. The R. P. M. of the pump must be proportional to engine R. P. M.

As there is a zero flow of fuel when no torque is developed and as this flow of fuel at zero torque increases approximately as the square of the speed, I have provided a by-pass around the variable resistance, which allows this minimum quantity of fuel to flow at zero torque. This flow at zero torque is controlled by the square of the revolutions per minute of the engine. Temporary control means are also provided to vary the effect of the two devices responsive to revolutions per minute on the control mechanism. Hence, it is possible by a torque responsive device and an R. P. M. responsive device to control the mixture for every change in revolutions per minute and in torque, and temporarily during acceleration and deceleration, to change the mixture to give a rich mixture for acceleration and for deceleration a lean mixture.

Another object of the invention is to provide one single control to regulate the speed of the engine by varying the pitch of the propeller, to vary the mixture ratio and to vary the torque and to maintain that torque regardless of altitude.

An additional object of this invention is to substitute for the torque control a control based on manifold pressure. It is possible to do this because at any given engine speed, the manifold pressure is directly related to the compression, and compression, in its turn, is directly related to torque. At variable engine speed this relationship does not exist due to the drop in pressure at the inlet valve seat which increases with speed. However, as engine speed is a factor of my control device, the control means responsive to the engine speed can be adjusted to correct for this drop in pressure, so that it is possible to substitute manifold pressure control for torque control device, provided a correction is made for altitude.

In the drawings:

Fig. 1 shows the relation between fuel, torque and R. P. M. with lean mixture ratios.

Fig. 2 shows the relation between fuel, torque and R. P. M. with normal mixture ratios.

Fig. 4 shows diagrammatically the essential elements of my invention after substituting manifold pressure means for torque responsive means as the chief control element.

Fig. 5 is a detailed fuel pump taken on plane 5—5 of Fig. 3.

Fig. 6 shows the torque responsive device and the method of connecting my torque controlled fuel supply to an ordinary air entrance and with the ordinary throttling means used on the air entrance to an aircraft engine.

Fig. 7 shows a cross sectional elevation taken on plane 7—7 of Fig. 6, and shows the details of the torque responsive device.

Figure 3:
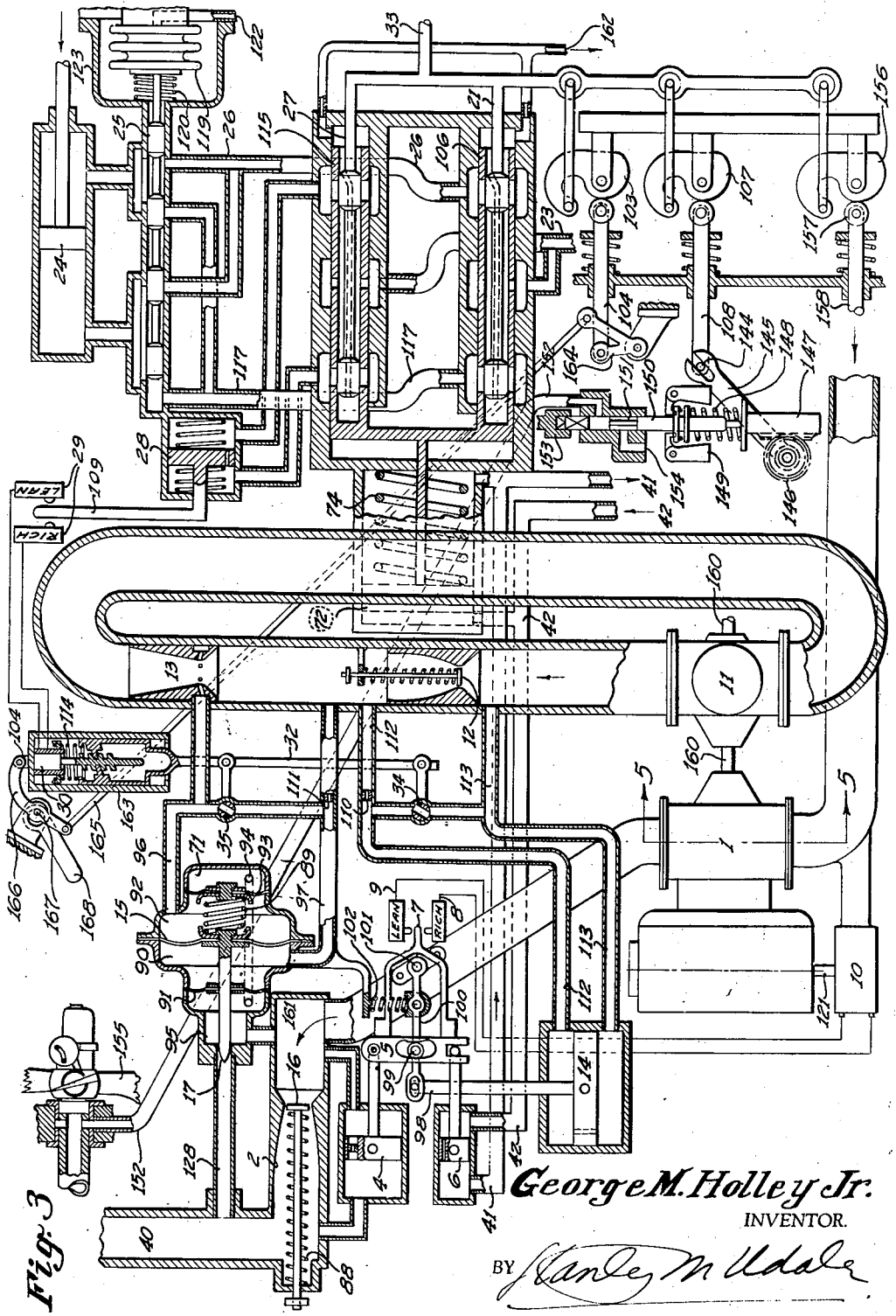
Fig. 3 shows diagrammatically the essential elements of my invention.

In Fig. 3, two engine-driven pumps 1 and 11 are shown—one #11 adapted to develop pressure differences proportional to the revolutions per minute; the other #1 is a variable stroke pump adapted to deliver fuel to the engine proportional to the revolutions per minute and to the stroke.

10 is an electric motor operating the shaft 121 which increases the pump stroke by moving the shaft 87 (Fig. 5) away from center which displaces the two pistons 83, 84. The slotted cylinder 82 in which slides the rectangular piston 83 is rotated at engine speed by the shaft 160. Fuel is displaced both by the reciprocation of the piston 83 in the slot in the cylinder 82 and by the reciprocation of the piston 84 in the slot inside the piston 83.

16 is an obstruction in a fuel passage 2 which forms therewith a variable restriction in the path of the fuel discharged from this variable stroke pump 1. The location of this obstruction is determined by a compression spring 88 which controls the effective area of the restriction. The contour of the fuel passage 2 is such as to give a substantially straight line relationship between fuel flow and pressure difference resulting from fuel flow. Hence, the movement of this obstruction 16 responds to fuel flow and fuel flow is proportional to the difference between the pressures on the two sides of the obstruction 16.

Figure 2:
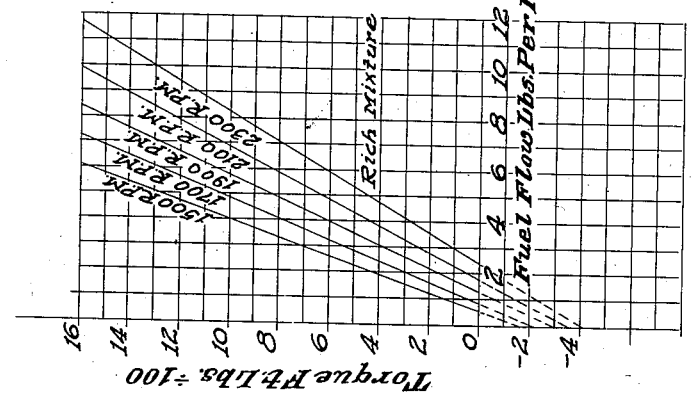
Figure 1:
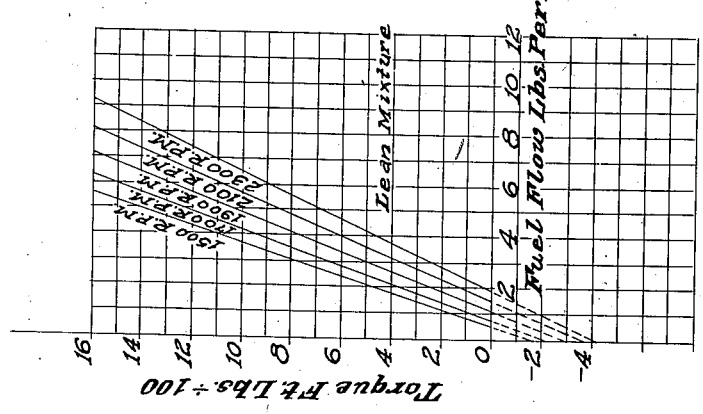

A valve 17 controls a by-pass 128 which admits fuel to the outlet 40 without passing through the passage 2. The minimum flow of fuel per revolution, as shown in Figs. 1 and 2 increases with the R. P. M. at a somewhat faster rate than directly to the speed. This valve 17 is therefore connected directly to a diaphragm 15, which diaphragm is supported by a spring 89. A chamber 90 to the left of the diaphragm 15 is separated from the fuel chamber 95 by a flexible diaphragm 91 which serves instead of packing.

The valve 17, the surface of which is formed is formed into a hyperbolic curve, is opened by the diaphragm 15 which responds to the square of the velocity of flow through a venturi 13 so that the higher the revolutions per minute, the more the valve 17 opens. The flow through the liquid venturi 13 is determined by an engine-driven pump 11. This takes care of the fact that the starting points of the sloping lines in Figs. 1 and 2 start at different fuel flows in pounds per hour, depending on the revolutions per minute. In other words, the fuel flow at zero torque increases with R. P. M. Hence the valve 17 opens as the velocity through the venturi 13 increases.

A chamber 92 is located to the right of the diaphragm 15 and is separated from a fuel chamber 71 by another diaphragm 93. The chamber 71 is connected through a passage 94 with the chamber 95 in which the low speed fuel valve 17 is located. This chamber 95 in its turn is connected to the entrance to the fuel outlet 161 from the variable fuel pump 1.

A passage 96 connects the chamber 92 with the throat of the venturi 13. A passage 97 connects the chamber 90 with the entrance to the venturi 13. Hence the difference between the pressures in the passages 96 and 97 varies with the square of the velocity of flow through the venturi 13, that is to say, with the square of the velocity of the engine, as the flow through the venturi 13 varies with the R. P. M. of the engine.

The pump 11 discharges a liquid which impinges on the obstruction 12 which is similar to the obstruction 16 so that the pressure differences created by the spring-loaded obstruction 12 are designed to be a linear function of the R. P. M. of the engine by the contour of the passage in which the obstruction 12 moves.

*Mixture control*

A piston 14 responds to these differences in pressure, pipes 112 and 113 communicating above and below the piston 14 and above and below the obstruction 12.

A rod 98 is connected to the piston 14 and moves a roller 99 mounted on a lever 100 pivoted at 101. This roller 99 is the movable fulcrum of a lever 5, which lever is connected at one end with a piston 4, which piston 4 responds to the pressure differences between the two sides of the obstruction 16, which differences are devised to be a linear function of the fuel flow by reason of the contour of the passage 2. The lever 5 is connected at its other end with a piston 6 which responds directly to the valve of the torque. A pipe 42 transmits the torque pressure to the right hand side of the piston 6 and an outlet passage 41 takes care of any leakage around the piston 6 and prevents any pressure building up on the left of the piston 6.

A movable contact 7 mounted on the lever 5 makes electrical contact with the two stationary contacts 8 and 9. The contact 8 is marked "rich" the contact 9 "lean." Hence, when the lever 7 rises and engages with the contact 9, the electric motor 10 is energized to decrease the discharge from the variable fuel pump 1. When the lever 7 descends and engages the contact 8 marked "rich," the motor 10 rotates in the opposite direction and increases the quantity of fuel discharged per revolution from the fuel pump 1.

*Engine control*

The control 33 is provided which, when it moves to the right, causes an increase in power and a decrease in power when moved to the left. A series of cams are connected to the control 33, specifically the cam 103 controlling the rod 104, which varies the mixture ratio; cam 156 controlling a valve 157 moving a rod 158 which is connected to the spark advance (not shown); cam 107 which engages with rod 108 which regulates the speed of the engine by regulating the speed of the variable pitch propeller 155.

Thus speed increases as the manual control 33 moves to the right. A pin 144 engages with a lever 145 which controls a gear 146 and the rack 147 which compresses a spring 148 which increases the speed at which the governor weights 149 become operative to compress the spring 148 and to move the rotating valve 150, which reciprocates in the chamber 151. The rotating valve 150 has a squared end which engages with the squared opening in the rod 153 which is driven by the engine at a speed proportional to the engine. The governor weights 149 are driven by the rotating valve 150 and compress the spring 148. The rotating valve 150 admits oil pressure to the pipe 152, the oil pressure being admitted to the valve chamber 151 through a passage 154.

The oil pressure admitted through the pipe 152 adjusts the pitch of the propeller blade 155 so that the speed of the engine corresponds to the speed desired. Hence the movement of the manually operated control 33 to the right increases the speed of the engine.

A decrease in richness of the mixture is obtained at torque and R. P. M. corresponding to cruising lean by means of the rod 104 controlled by cam 103 which moves the element 163 downwards by means of the bell crank lever 164, rod 165 and lever 166, which rocks on an eccentric fulcrum 167. This eccentric is controlled by a manually controlled lever 168. Hence the relationship between torque and fuel, shown in Fig. 1, can be changed to the relationship shown in Fig. 2.

Let us assume that the system is in equilibrium when cruising lean at 1700 R. P. M. and that a higher speed and torque are desired, and the master control 33 is moved to the right. At any selected speed there is a predetermined torque desired. The compressing spring 74 which engages with the piston 72 balances the torque admitted to the pipe 42 when this desired relationship is attained. When the control 33 is moved to the right, the speed immediately increases and the torque is therefore momentarily lower than that which is desired at this speed, which speed is increased by the clockwise rotation of the cam 107.

The throttle (Fig. 6) is opened to obtain this increased torque as follows: A servomotor valve 21 is connected to the master control 33. When this valve moves to the right it momentarily leaves behind it the sleeve 106, the position of which is determined by the torque which is momentarily below the desired value. Oil pressure is thus permitted to enter through the pipe 23 and to flow through the pipe 26 to the right hand side of the piston 24, which piston 24 (Fig. 6) is connected through the link 143 with the link 46 of the throttle lever 47 connected to the throttle 48. Hence, as the piston 24 moves to the left, the throttle 48 opens and more air is admitted to the engine so that the desired torque is developed. At the same time, the mixture ratio is maintained at the desired figure by means of the mechansm shown at the left of Fig. 3.

Meanwhile, the torque increases and the piston 72 moves to the right and carries with it the sleeve valve 106 so that the relative position of the sleeve valve 106 and the servomotor valve 21 is restored and the equilibrium of the system is restored once more. When the piston 24 moves to the left, low pressure oil descends through the pipe 117 and flows from the left hand side of the valve 21 through a small passage in the center of the valve 21 and escapes through the pipe 162.

*Acceleration and deceleration*

In addition to the control of the mixture during steady running, it is desirable to increase the fuel ratio temporarily during acceleration. During deceleration, a reduction in fuel is also desirable.

The hyperbolic contour of the nose of the valve 17 determines the relationship between the R. P. M. and the initial flows at zero torque. The changes in initial opening of the valve 17 as shown in Figs. 1 and 2 are taken care of by the movement of the valve 35, and the change in the slope of the lines shown in Figs. 1 and 2, as conditions are changed, are taken care of by the rotation of the valve 34, and both of these changes respond to the movement of the cam 103 controlled by the master control 33. The rotation of the cam 103 moves the rod 104 to the left. This rod is connected to the device 163 which contains mechanism which controls the position of the valves 34, 35. An electric motor 30 is energized by a pair of contacts 29 similar to the pair of contacts 8 and 9, and these contacts are also marked "rich" and "lean." An arm 109 controlled by a piston 28 determines whether the motor 30 is to be rotated so as to open or to close the valves 34 and 35, to which the electric motor is connected by a worm gear drive. A spring 140 maintains the valves 34 and 35 in the neutral position for which the device is calibrated.

When the valve 35 opens the pressure difference between the two sides of the diaphragm 15 is reduced so that the valve 17 is closed and the mixture ratio becomes leaner. Similarly, when the valve 34 opens, the pressure difference between the two sides of the speed responsive piston 14 is reduced and the spring 102 lowers the roller 99 which is the pivot for the lever 5, so that it takes less fuel to balance a given torque, and again the mixture becomes lean. On the other hand, when the valves 34 and 35 close, the needle 17 opens and the roller 99 rises and it takes a greater fuel flow to balance a given torque and so the mixture becomes richer both because of the increased opening of the needle 17 and because of the rise of the roller 99.

The restrictions 110 and 111 in the pipes 112 and 97 determine the effectiveness of a given movement of the valves 34 and 35. When the manual control 33 is moved to the right to increase power, a servomotor valve 27 moves the servomotor piston 28 to the left so as to engage the rich contact and to temporarily cause the mixture to become rich. (When the piston 28 moves to the right, it engages the lean side of the control of the motor 30.) Hence the motor 30 closes the valves 34 and 35 and as above stated, causes the mixture to become temporarily rich during the acceleration of the engine when the piston 28 moves to the left.

The spring 114 restores the valves 34 and 35 to their normal positions when the torque built up by the increase of power restores the sleeve valve 115 to the position shown in the drawing. The restoration of this sleeve valve 115 is accomplished by means of the piston 72, which is subjected at its left hand side to the torque pressure transmitted by the pipe 42. On the right hand side, it is connected to the low pressure pipe 41 of the torque meter so that as an increase of torque takes place, the piston 72 moves to the right, compressing the spring 74, moving the piston rod and the sleeve valve 115 to the right. A small passage through the center of the piston 28 restores it to its midposition by reason of the two compression springs, one at either side of the piston, whenever the valve 27 and the sleeve valve 115 assume the position shown in the drawing, which is the neutral position. It will be noted that the valve 27 laps over the openings in the sleeve valve 115 more than does the valve 21 over the openings in its sleeve valve 106.

The operating fluid oil for the servomotor constituted by the piston 28 and the valves 27 and 115, is supplied through a pipe 23 so that when the valve 27 moves to the right, the piston 28 moves to the left, which, as stated above, causes the mixture to become rich. The oil displaced by the piston 28 escapes through a passage drilled in the center of the valve 27 and then out through an outlet pipe 162.

The contacts 29, marked "rich" and lean," indicate that the ratio of the mixture is to be made richer or leaner whereas in the case of the contacts 8 and 9, these contacts 8 and 9 indicate that the mixture is too rich or too lean from the desired figure, and is to be corrected automatically and brought back to the desired intermediate mixture ratio. In other words, the contacts 29 are specific for acceleration and also, of course, for deceleration, and to prevent stalling, and therefore the contacts 29 are only engaged temporarily when the power control 33 is moved to the right or left to increase or decrease power, whereas the contacts 8 and 9 are intended to constantly maintain the mixture ratio between narrow limits determined by the conditions of speed and torque.

In the event that one or more of the engine cylinders quit, the torque of the engine will immediately fall and the sleeve valves 115 and 106 automatically move to the left. The arm 109 immediately moves to the rich position and the piston 24 immediately moves to open the throttle. Thus we have an anti-stall device which in an emergency is of value in preventing the engine stalling in the air which may cause a catastrophe.

A 4-part valve 25 prevents excessive supercharge pressure. In the event that supercharge pressure exceeds say 47" of mercury, this pressure is exerted on the inside of a bellows 119 being admitted through a pipe 122. This pressure compresses the spring 120, the compression of which permits the bellows 119 to move the valve 25 to the right. This movement cuts off the communication of the pipe 26 with the right hand side of the piston 24 and permits the oil pressure in the pipe 26 to act on the left hand side of the piston 24 to close the valve. At the same time, oil is permitted to escape from the right hand side of the piston 24 down the pipe 117 through the passage in the center of the valve 116. A closed chamber 123 is provided to enclose the bellows 119. The pressure inside the chamber 123 is preferably maintained at 30" of mercury but of course can be at any other figure set.

Hence the movement of the power control 33 to the right controls three factors: (a) It selects the speed of the propeller through the cam 107 and rod 108; (b) it selects the mixture ratio through the position of the cam 103 and rod 104, and (c) it determines the torque pressure by determining the position of the piston 72 and the compression of the spring 74.

A throttle 48 is shown in Fig. 6 controlled by a lever 47 and a link 46 and a lever 143. A compression spring between the lever 47 and the link 46 prevents the buckling of the rod 46 when the throttle is closed against the idle stop by the movement of the piston 24 to the right. A supercharger 50 is driven by a crankshaft 51. The fuel is discharged through the passage 40 in the center of the supercharger 50 and the mixture of fuel and air passes through the inlet valve 54 into the cylinder 53 where it is exploded against the surface of the piston 52, whence it escapes past the exhaust valve 55.

The engine is shown with a crankshaft 51 and a two-to-one gear assembly 56 and 57, which operates the timer 39 which has a control 38. The crankshaft 51 drives the internal gear 58 which engages with the pinions 70, 70 mounted on the spider 69. The spider 69 carries the shaft 68 which drives the propeller of the engine. The pinions 70 also engage with a spur gear 59 mounted on an arm 60. This arm 60 is connected through the connecting rod 61, 62 (Fig. 7) with pistons 63, 64. A valve 65 located on piston 63 admits high pressure oil from a pipe 66. When the piston 63 moves to the right, the piston 65 closes the port through which high pressure oil is admitted so that a balance is reached.

Any leakage around the piston 63 is taken care of by a return pipe 41. The oil pressure acting on the piston 63 communicates through the pipe 67 with the cylinder back of the other piston 64, so that the pressures acting on the pistons 63 and 64 are equal and opposite. The torque of the engine is thereby balanced so that the pressure in the pipe 42 is a measure of the torque developed by the engine. The pipe 42 communicates with the corresponding pipe 42 shown in Fig. 3 and the drain pipe 41 is connected to the corresponding pipe 41 which is the pipe of zero pressure, that is, the return pipe of the leakage around the piston 72.

In Fig. 4 modifications are shown so that the manifold air pressure can be substituted for the torque. The piston 129 is substituted for the piston 6 and the manifold air pressure is communicated from the manifold 136 through the pipe 135 to the right hand side of the piston 129. To the left of the piston 129 substantial constant vacuum has to be maintained, so that the right hand side of the piston 129 can respond to increase and decrease manifold pressure.

In order to maintain the left hand side of the piston 129 at as low pressure as possible and in any case lower than any inlet manifold pressure, a vacuum pump is shown comprising a vacuum piston 131 communicating with the pipe 130 on its outward stroke and on its inward stroke compressing any air in a cylinder 132, and discharging the compressed air through the opening 134 maintained by a check valve 133. This piston 131 is shown operated by the crank shaft 51. Hence in the operation of the engine a substantial vacuum is maintained at all times to the left of the piston 129. Otherwise, the operation remains as before except that pipes 137 and 138 are connected in place of the pipes 42 and 41 in Fig. 3, so that the piston 72 now responds to manifold air pressure so that when the power control 33 is moved to the right, the throttle is opened so as to maintain the manifold air pressure at the figure corresponding to the selected R. P. M. of the engine, as selected by the master control 33.

In Fig. 4 the piston 24 is shown connected through a bell crank lever 139 and a link 140 to a throttle 141. In order to prevent jamming the throttle 141 shut, a short compression spring 142 is provided in the ball crank lever 139. In Fig. 4 the air entrance 43 is shown with a fuel passage 40 discharging into the center of the supercharger 50.

As the altitude increases at any given manifold air pressure at any given R. P. M., the power increases slightly. A correction for this is shown consisting of an evacuated bellows 169 supported internally by a spring and adapted to control an orifice by means of a needle valve 170 which permits some of the air pressure in the pipe 137 to escape to the vacuum line 138. A restriction 171 makes the orifice around the needle valve 170 effective to increase manifold air pressure as the plane descends to sea level.

For example, if the pressure in the inlet passage 136 is 47" of mercury, then at sea level the pressure in the pipe 137 would be, say, 44" of mercury because of the leakage around the needle 170 which is then in the raised position. The 44" of mercury pressure would then be effective on the piston 72 (Fig. 3). Hence at sea level the speed corresponding to a pressure of 44" of mercury at altitude is selected but actually the engine is operating with air at 47" of mercury pressure, so that it will maintain the same power at sea level as it did at altitude, the 3" increase in pressure compensating for the fact that there is a large fall of pressure of the atmosphere so that a pressure of 44" of mercury is more effective in filling the cylinder with fresh air at altitude than it is at sea level. The restriction 171 is made so that it bears a definite relation to the leakage around the needle 170 when the needle is raised at sea level, so as to establish the desired pressure difference between the passage 138 and the pipe 137.

Spark advance

The cam 156 when rotated clockwise by the movement of the master control 33 to the right moves the rod 158 to the left so as to engage with the rod 38 (Fig. 6). This will advance the spark so that with increasing speed, the spark is advanced until at a given speed and a given torque, the maximum spark advance is obtained. The increase of speed and torque beyond this point will give no advance, and in fact a slight retardation in the spark advance is desirable at maximum R. P. M. and maximum torque.

What I claim is:

1. In an internal combustion engine having a torque responsive device including an element movable in response to torque, manually operated control means for selecting and automatic means for maintaining the torque and the mixture ratio of the engine at selected values comprising an air entrance to said engine, a throttle valve therein, a servomotor adapted to open and close said throttle, said servomotor being controlled by double valves adapted when displaced relatively to each other to cause the servomotor to operate, one of said valves being connected to said manually operated control means and the other to the movable torque responsive element so that on moving the said control the valves are displaced relatively to each other and the throttle is opened until the selected torque is developed by the engine and the valves are restored to their neutral position, fuel supply means for said engine, including a fuel pump, flow responsive means adapted to create a differential fluid pressure directly proportional to the rate of fuel flow from said pump to said engine, an element adapted to be moved by said differential pressure, a second torque responsive element, a balancing device adapted to be held in equilibrium by the element movable by said differential fuel pressure and by said second torque responsive element, said second torque responsive element being adapted to balance the element responsive to differential fuel pressure when the desired relation between torque and fuel is established, a mixture control servomotor operated by said balancing device, pump control means operated by said mixture control servomotor to increase and decrease the rate of fuel flow, an element adapted to respond to the first power of the R. P. M. of the engine and operatively connected to said balancing device for modifying the relative effect of the fuel flow responsive element to the effect of the torque responsive element on said balancing device so as to render the torque responsive element less effective in balancing the means proportional to the rate of fuel flow at low engine speed than at high engine speed whereby the fuel flow is regulated as a linear function of the R. P. M. and of the torque of the engine.

2. In a device as set forth in claim 1 in which there is a constant speed propeller driven by said engine, means for regulating the R. P. M. of said propeller and thus regulating the R. P. M. of the engine, said means being operatively connected to said manually operated engine control means whereby the R. P. M. is decreased and increased as the torque is decreased and increased.

3. In a device as set forth in claim 1 in which there is a constant speed propeller driven by said engine, means for regulating the R. P. M. of said propeller and thus regulating the R. P. M. of the engine, said means being operatively connected to said manually operated engine control means, means for modifying the influence of the element responsive to R. P. M. on said balancing means, said modifying means being operatively connected to said manually operated engine control means whereby the R. P. M. is increased as the torque is increased and the mixture ratio is increased to a maximum when the engine is operating at its maximum speed and torque.

4. In a device as set forth in claim 1 in which there is a third servomotor adapted to temporarily increase said fuel supply during acceleration and to temporarily decrease said fuel supply during deceleration, double valves for said servomotor, adapted when displaced from their neutral position relatively to each other to cause said servomotor to operate, one of said valves being connected to said manually operated engine control means, the other valve being connected to said first torque responsive element, the minimum valve displacement required to cause the operation of said servomotor being greater than that required to render the first servomotor operative, said third servomotor being therefore operative only when said manually operated control means is moved quickly so as to cause a temporary abnormal displacement of the double valves of said third servomotor.

5. In a device as set forth in claim 1 in which there is a supercharger, means responsive to the maximum pressure of said supercharger and adapted to cause said first mentioned servomotor to close the throttle when said supercharger pressure exceeds a predetermined maximum value.

6. In an internal combustion engine having a supercharger including an element movable in response to the pressure created by said supercharger, manually operated control means for selecting and automatic means for maintaining the pressure generated by said supercharger and the mixture ratio at selected values, comprising an air entrance to said engine, a throttle valve therein, a servomotor adapted to open and close said throttle, said servomotor having double valves adapted when displaced from their neutral position relative to each other to cause said servomotor to operate, one of said valves being connected to said manually operated control means and the other to said movable supercharger pressure responsive element so that on moving the control the valves are displaced relatively to each other, the throttle is opened until the selected pressure is developed by the supercharger and the valves are restored to their neutral position, fuel supply means for said engine including a fuel pump, flow responsive means adapted to create a differential fluid pressure directly proportional to the rate of fuel flow from said pump to said engine, an element adapted to be moved by said differential pressure, a second supercharger pressure responsive element, a balancing device adapted to be held in equilibrium by the element movable by said differential fuel pressure and by said second supercharger pressure responsive element, said pressure responsive element being adapted to balance the element responsive to differential fuel pressure when the desired relation between supercharger air pressure and fuel supply is established, a mixture control servomotor operated by said balancing device, pump control means operated by said mixture control servomotor to increase and decrease the rate of fuel flow, an element adapted to respond to the first power of the R. P. M. of the engine and operatively connected to said balancing device for modifying the opposing effects of the fuel flow responsive element and of the supercharger pressure responsive element on said balancing device, so as to render the element responsive to supercharger pressure less effective in balancing the element responsive to fuel flow at lower engine speeds than at higher engine speeds, whereby the fuel flow is regulated as a linear function both of the R. P. M. of the engine and of the pressure generated by said supercharger.

7. In a device as set forth in claim 6, a constant speed propeller driven by said engine, means for regulating the R. P. M. of said propeller and thus regulating the R. P. M. of the engine, said means being operatively connected to said manually operated engine control means, whereby the R. P. M. is decreased and increased as the pressure generated by the supercharger is decreased and increased.

8. In a device as set forth in claim 6, a constant speed propeller driven by said engine, means for regulating the R. P. M. of said propeller and thus regulating the R. P. M. of the engine, said means being operatively connected to said manually operated engine control means, additional means for modifying the influence of the element responsive to R. P. M. on said balancing means, said modifying means being operatively connected to said manually operated engine control means, whereby the R. P. M. is increased as the air pressure is increased and the mixture ratio is increased to a maximum when the engine is operating at its maximum speed and under its maximum inlet air pressure.

9. In a device as set forth in claim 6 in which there is a third servomotor adapted to temporarily increase said fuel supply during acceleration and to temporarily decrease said fuel supply during deceleration, double valves for said servomotor adapted when displaced from their neutral position relatively to each other to cause said servomotor to operate, one of said valves being connected to said manually operated engine control means, the other valve being connected to said supercharger pressure responsive element, the minimum valve displacement required to cause the operation of said servomotor being greater than that required to render the first servomotor operative, said third servomotor being therefore operative only when said manually operated engine control means is moved quickly so as to cause a temporary abnormal displacement of the double valves of said third servomotor.

10. In a device as set forth in claim 6, an element adapted to respond to changes in atmospheric pressure, a valve controlled thereby, said valve being adapted to modify the supercharger pressure operating the first mentioned supercharger pressure responsive element, whereby at high altitudes the selected supercharger pressure at any given position of said manually operated control means is less than at sea level.

11. In an internal combustion engine having automatic means responsive to the speed and to the torque developed for maintaining the speed torque and mixture ratio at predetermined values, manually operated means for simultaneously varying all of said values.

GEORGE MALVIN HOLLEY, Jr.